US011352956B2

(12) United States Patent
Rodriguez et al.

(10) Patent No.: US 11,352,956 B2
(45) Date of Patent: *Jun. 7, 2022

(54) AIR TURBINE STARTER WITH DECOUPLER

(71) Applicant: GE AVIATION SYSTEMS LLC, Grand Rapids, MI (US)

(72) Inventors: Eliel Fresco Rodriguez, Springboro, OH (US); David Allan Dranschak, Union, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/718,796

(22) Filed: Dec. 18, 2019

(65) Prior Publication Data

US 2020/0123983 A1   Apr. 23, 2020

Related U.S. Application Data

(63) Continuation of application No. 15/185,080, filed on Jun. 17, 2016, now Pat. No. 10,519,865.

(51) Int. Cl.
| | |
|---|---|
| *F02C 7/277* | (2006.01) |
| *F02C 3/04* | (2006.01) |
| *F02C 7/32* | (2006.01) |
| *F02C 7/36* | (2006.01) |
| *F16D 9/06* | (2006.01) |
| *F16D 9/08* | (2006.01) |
| *F16D 11/04* | (2006.01) |
| *F16D 41/22* | (2006.01) |

(52) U.S. Cl.
CPC ............... *F02C 7/277* (2013.01); *F02C 3/04* (2013.01); *F02C 7/32* (2013.01); *F02C 7/36* (2013.01); *F16D 9/06* (2013.01); *F16D 9/08* (2013.01); *F16D 11/04* (2013.01); *F16D 41/22* (2013.01); *F05D 2220/32* (2013.01); *F05D 2260/311* (2013.01); *F05D 2260/38* (2013.01); *F05D 2260/40* (2013.01); *F05D 2260/4023* (2013.01); *F05D 2260/40311* (2013.01); *F05D 2260/85* (2013.01); *F05D 2270/021* (2013.01)

(58) Field of Classification Search
CPC .......... F05D 2260/40; F16D 9/06; F16D 9/08; F02C 7/277; Y10T 403/11
See application file for complete search history.

(56) References Cited

U.S. PATENT DOCUMENTS

| | | |
|---|---|---|
| 1,610,414 A | 12/1926 | Bernard |
| 2,602,335 A | 7/1952 | Miller |
| 2,951,570 A | 9/1960 | Antrim, Jr. et al. |
| 2,964,931 A | 12/1960 | Sorenson |

(Continued)

FOREIGN PATENT DOCUMENTS

| | | |
|---|---|---|
| CN | 102003321 A | 4/2011 |
| CN | 102439284 A | 5/2012 |

(Continued)

*Primary Examiner* — Ninh H. Nguyen
*Assistant Examiner* — John S Hunter, Jr.
(74) *Attorney, Agent, or Firm* — McGarry Bair PC (57) ABSTRACT

A method and decoupler for disengaging an output member from an engine in a back drive event with a backdrive decoupler. The backdrive decoupler includes a shaft and a retention mechanism selectively coupling the output member to the shaft. In a backdrive event, the decoupler decouples the member from a drive shaft.

20 Claims, 8 Drawing Sheets

(56) References Cited

U.S. PATENT DOCUMENTS

| | | | |
|---|---|---|---|
| 3,220,218 | A | 11/1965 | Rio et al. |
| 4,184,345 | A | 1/1980 | Cutler |
| 4,281,942 | A | 8/1981 | Gaeckle et al. |
| 4,768,634 | A | 9/1988 | Quick et al. |
| 4,786,271 | A | 11/1988 | Menn |
| 4,871,296 | A | 10/1989 | Laessle et al. |
| 5,658,087 | A | 8/1997 | Butkovich |
| 6,059,085 | A | 5/2000 | Farnsworth |
| 6,859,085 | B2 | 2/2005 | Watanabe et al. |
| 7,591,356 | B2 | 9/2009 | Guyader |
| 8,006,819 | B2 | 8/2011 | Dell et al. |
| 8,105,018 | B2 | 1/2012 | Gockel et al. |
| 8,479,847 | B2 | 7/2013 | Hart et al. |
| 8,616,170 | B2 | 12/2013 | Horijoski et al. |
| 8,973,547 | B2 | 3/2015 | Antchak et al. |
| 9,051,972 | B2 | 6/2015 | Garvey |
| 9,188,097 | B2 | 11/2015 | Gray et al. |
| 2012/0118103 | A1 | 5/2012 | Blewett et al. |

FOREIGN PATENT DOCUMENTS

| | | |
|---|---|---|
| CN | 105074196 A | 11/2015 |
| EP | 2098741 A2 | 9/2009 |

AIR TURBINE STARTER WITH DECOUPLER

CROSS REFERENCE TO RELATED APPLICATION

The present application is a continuation of U.S. patent application Ser. No. 15/185,080, filed Jun. 17, 2016, and now U.S. Pat. No. 10,519,865, issued Dec. 31, 2019, which is incorporated herein by reference in its entirety.

BACKGROUND OF THE INVENTION

An aircraft engine, for example a gas turbine engine, is engaged in regular operation to an air turbine starter. The internal components of both the gas turbine engine and the air turbine starter spin together and can each include gearboxes allowing for step down or step up ratios between consecutive parts. To prevent back drive, an overrunning clutch is placed between the air turbine starter output shaft and the air turbine starter gearbox section. Back drive events can occur when the engine drives the output shaft of the air turbine starter resulting in over spinning a turbine rotor in the air turbine starter. In a back drive event, it can be desirable to decouple the air turbine starter from the gas turbine engine.

BRIEF DESCRIPTION OF THE INVENTION

In one aspect, the present disclosure relates an air turbine starter for starting an engine, comprising a housing defining an inlet, an outlet, and a flow path extending between the inlet and the outlet for communicating a flow of gas therethrough, a turbine member journaled within the housing and disposed within the flow path for rotatably extracting mechanical power from the flow of gas, a gear train drivingly coupled with the turbine member, a clutch having a drive shaft that is operably coupled with the gear train, an output member with a receiving portion configured to be operably coupled to and rotate with the engine, and a backdrive decoupler, comprising: a shaft operably coupled to the output member and selectively receivable and axially moveable with respect to the receiving portion of the output member; and a retention mechanism extending axially through a portion of the output member and a portion of the shaft and selectively operably coupling the output member to a first end of the shaft; wherein when overrunning torque reaches a certain level the retention mechanism uncouples the drive shaft and the first end of the shaft to define a decoupled and separated position where the output member is disengaged from the engine.

In another aspect, the present disclosure relates to a decoupler assembly for decoupling an output member from a drive shaft of an engine during backdrive, the decoupler assembly comprising a shaft having a first end with a stop and a second end configured to be operably coupled to the drive shaft and where the shaft is selectively receivable and axially moveable within a receiving portion of the output member; and a retention mechanism extending axially through a portion of the output member and a portion of the shaft and selectively operably coupling the output member to the first end of the threaded shaft, wherein when an overrunning torque reaches a certain level the retention mechanism uncouples the output member and the first end of the shaft and the output member moves in a direction away from the first end of the shaft.

In yet another aspect, the present disclosure relates a method for operating a starter motor, comprising extracting mechanical power from a flow of gas utilizing a turbine and driving a gear train and clutch having an output member therewith; transmitting a driving torque from a drive shaft through a shaft retained within a receiving portion of the output member by a retention mechanism having a primary axis extending axially through a portion of the output member and a portion of the shaft, to the output member, which is operably coupled to an engine; during back driving, ceasing retention by the retention mechanism when overrunning torque reaches a certain level such that the output member decouples from the engine; and retaining the output member in place to prevent reengagement of the output member and the engine.

DETAILED DESCRIPTION OF THE EMBODIMENTS

The present disclosure is related to a driving mechanism generating kinetic motion in the form of a rotating shaft coupled with a piece of rotating equipment. One non-limiting example of a driving mechanism can include a gas turbine engine rotationally driving a piece of rotating equipment, such as a starter. The starter has various applications including starting a gas turbine engine and generating electrical power when the gas turbine engine is in operation. While the exemplary embodiment described herein is directed to application of a gas turbine engine and a starter, embodiments of the disclosure can be applied to any implementation of a driving mechanism that generates rotational motion at a driving output, and provides the rotational motion to another piece of rotating equipment.

Figure 1:
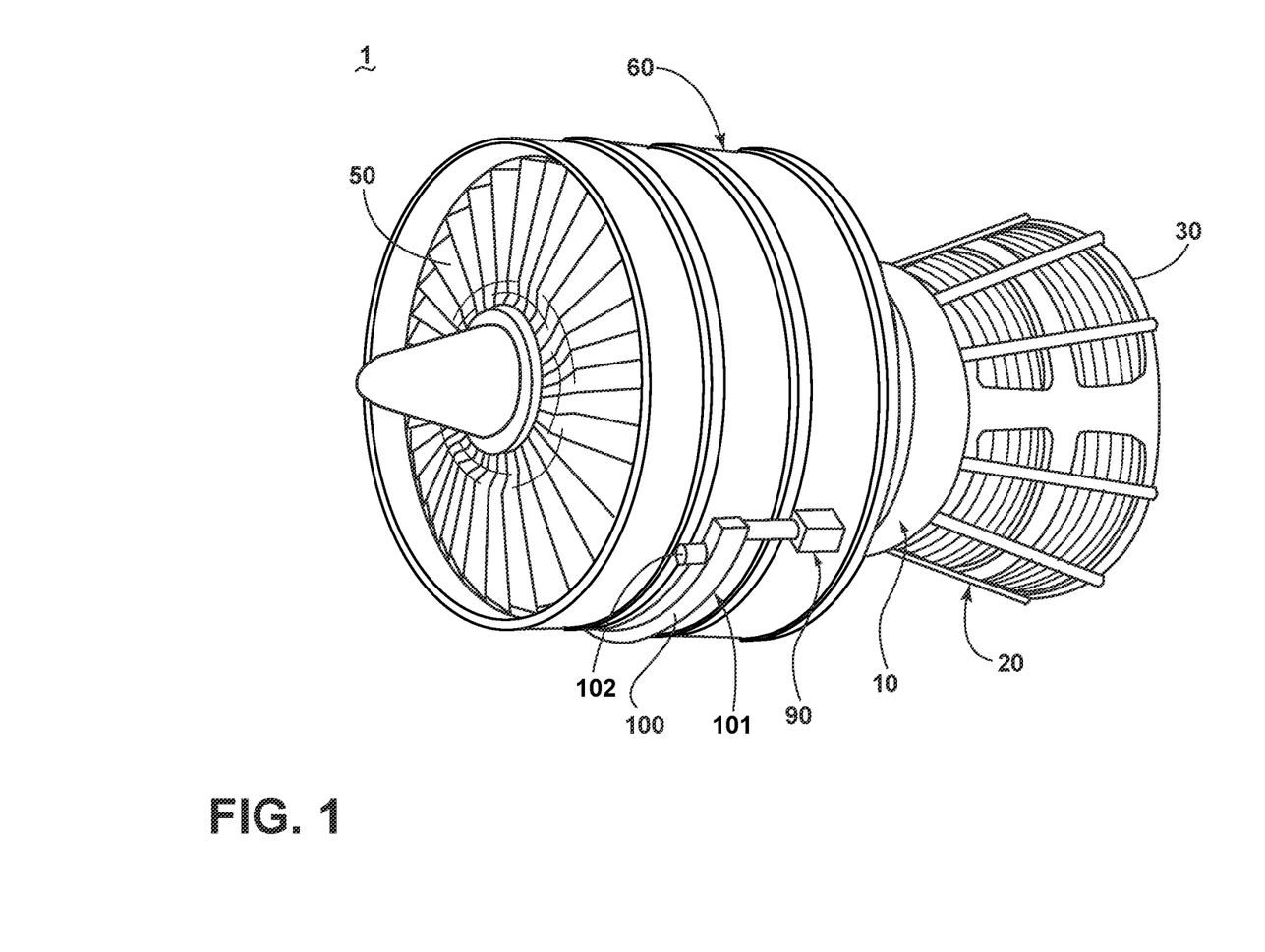
FIG. 1 is a schematic illustration of a gas turbine engine with an accessory gearbox in accordance with various aspects described herein.

Referring to FIG. 1, a starter motor or air turbine starter 102 comprising an accessory gear box (AGB) 100, also known as a transmission housing, are schematically illustrated as being mounted to a gas turbine engine 1. This assembly is commonly referred to as an Integrated Starter/Generator Gearbox (ISGB), or simply an air turbine starter. The gas turbine engine 1 comprises an air intake with a fan 50 that supplies air to a high pressure compression region 60. The air intake with a fan 50 and the high pressure compression region collectively are known as the 'cold section' of the gas turbine engine upstream of the combustion. The high pressure compression region 60 provides the combustion chamber 10 with high pressure air. In the combustion chamber, the high pressure air is mixed with fuel and combusted. The hot and pressurized combusted gas passes through a high pressure turbine region 20 and a low pressure turbine region 30 before exhausting from the gas turbine engine. As the pressurized gases pass through the high pressure turbine (not shown) of the high pressure turbine region 20 and the low pressure turbine (not shown) of the low pressure turbine region 30, the turbines extract rotational energy from the flow of the gases passing through the gas turbine engine 1. The high pressure turbine of the high pressure turbine region 20 can be coupled to the compression mechanism (not shown) of the high pressure compression region 60 by way of a shaft to power the compression mechanism. The low pressure turbine can be coupled to the fan 50 of the air intake by way of a shaft to power the fan 50.

The gas turbine engine can be a turbofan engine, such as a General Electric GEnx or CF6 series engine, commonly used in modern commercial and military aviation or it could be a variety of other known gas turbine engines such as a turboprop or turboshaft. The gas turbine engine can also have an afterburner that burns an additional amount of fuel downstream of the low pressure turbine region 30 to increase the velocity of the exhausted gases, and thereby increasing thrust.

The AGB 100 is coupled to a turbine shaft of the gas turbine engine 1, either to the low pressure or high pressure turbine by way of a mechanical power take-off 90. The mechanical power take off 90 contains multiple gears and means for mechanical coupling of the AGB 100 to the gas turbine engine 1. The assembly 102 can be mounted on the outside of either the air intake region containing the fan 50 or on the core near the high pressure compression region 60.

Figure 2:
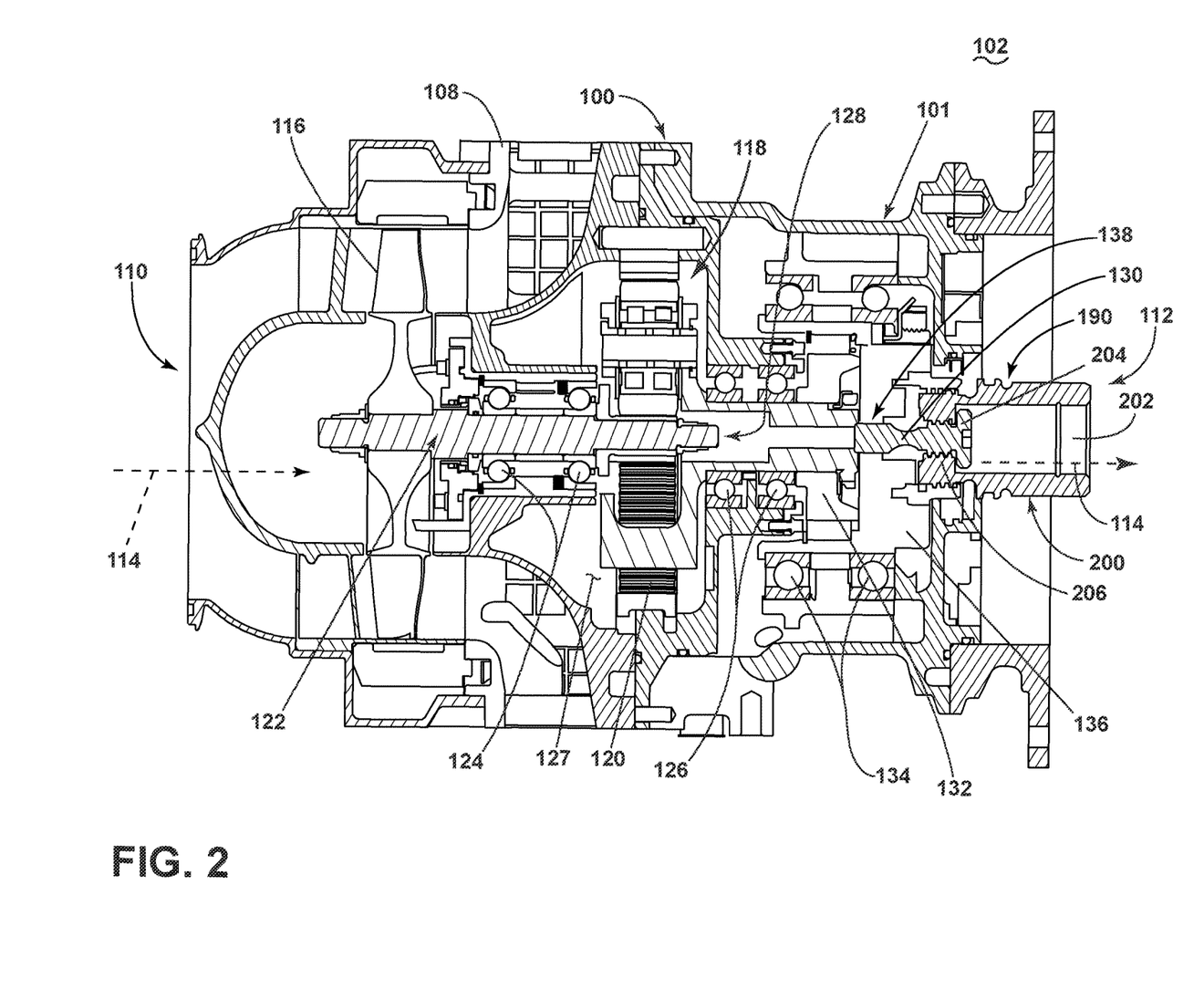
FIG. 2 is a sectional view of a starter mounted to the accessory gearbox of FIG. 1 by way of a rotating shaft, in accordance with various aspects described herein.

Referring now to FIG. 2, the air turbine starter 102 is shown in greater detail. Generally, the air turbine starter 102 includes a housing 108 defining an inlet 110, an outlet 112, and a flow path 114 extending between the inlet 110 and outlet 112 for communicating a flow of gas therethrough. The air turbine starter 102 includes a turbine member 116 journaled within the housing 108 and disposed within the flow path 114 for rotatably extracting mechanical power from the flow of gas along the flow path 114. Further, a gear train 118, disposed within the gear box 101 and drivingly coupled with the turbine member 116, can be caused to rotate.

The gear train 118 includes a ring gear 120 and can further comprise any gear assembly including for example but not limited to a planetary gear assembly or a pinion gear assembly. A turbine shaft 122 couples the gear train 118 to the turbine member 116 allowing for the transfer of mechanical power. The turbine shaft 122 is rotatably mounted to the gear train 118 and supported by a pair of turbine bearings 124 while the gear train 118 is supported by a pair of carrier bearings 126.

A gear box interior 127 can contain oil to provide lubrication and cooling to mechanical parts contained therein such as the gear train 118, ring gear 120, and bearings 124, 126.

There is an aperture 128 through which the turbine shaft 122 extends and meshes with a carrier shaft 130 to which a clutch 132 is mounted and supported by a pair of spaced bearings 134. A drive shaft 136 extends from a portion of the gear box 101 and is coupled to the clutch 132 and additionally supported by the pair of spaced bearings 134. The drive shaft 136 is driven by the gear train 118 and coupled to the power take-off 90 of the gas turbine engine 1, such that operation of the engine 1 provides a driving motion to the gear box 101.

The clutch 132 can be any type of shaft interface portion that forms a single rotatable shaft 138 comprising the turbine shaft 122, the carrier shaft 130, and the drive shaft 136. The shaft interface portion can be by any known method of coupling including, but not limited to, gears, splines, a clutch mechanism, or combinations thereof. An example of a shaft interface portion 132 is disclosed in U.S. Pat. No. 4,281,942 to General Electric and is incorporated herein by reference in its entirety.

The gear box 101 and the starter 102 can be formed by any known materials and methods, including, but not limited to, die-casting of high strength and lightweight metals such as aluminum, stainless steel, iron, or titanium. The housing for the gear box 101 and starter 102 can be formed with a thickness sufficient to provide adequate mechanical rigidity without adding unnecessary weight to the assembly 102 and, therefore, the aircraft.

The rotatable shaft 138 can be constructed by any known materials and methods, including, but not limited to extrusion or machining of high strength metal alloys such as those containing aluminum, iron, nickel, chromium, titanium, tungsten, vanadium, or molybdenum. The diameter of the turbine shaft 122, carrier shaft 130, and drive shaft 136 can be fixed or vary along the length of the rotatable shaft 138. The diameter can vary to accommodate different sizes, as well as rotor to stator spacings.

As described herein, either the gear box 101 or the starter 102 can be a driving mechanism for driving the rotation of the rotating shafts 122, 130, 136. For example, during starting operations, the starter 102 can be the driving mechanism for rotation of the rotating shafts 122, 130, 136. Alternatively, during normal gas turbine engine 1 operation, the gear box 101 can be the driving mechanism for rotation of the rotating shafts 122, 130, 136. The non-driving mechanism, that is, the equipment being driven by the driving mechanism, can be understood as rotating equipment utilizing the rotational movement of the rotating shafts 122, 130, 136, for example to generate electricity in the starter 102.

The drive shaft 136 is further coupled to a decoupler assembly 190 comprising a backdrive decoupler 200 having an output member, which can be for example, an output shaft 202, configured to be operably coupled to and rotate with the engine 1, and a threaded shaft 204. The threaded shaft 204 is selectively receivable and axially moveable within a receiving portion, which can be for example, a threaded portion 206 of the output shaft 202.

Figure 3:
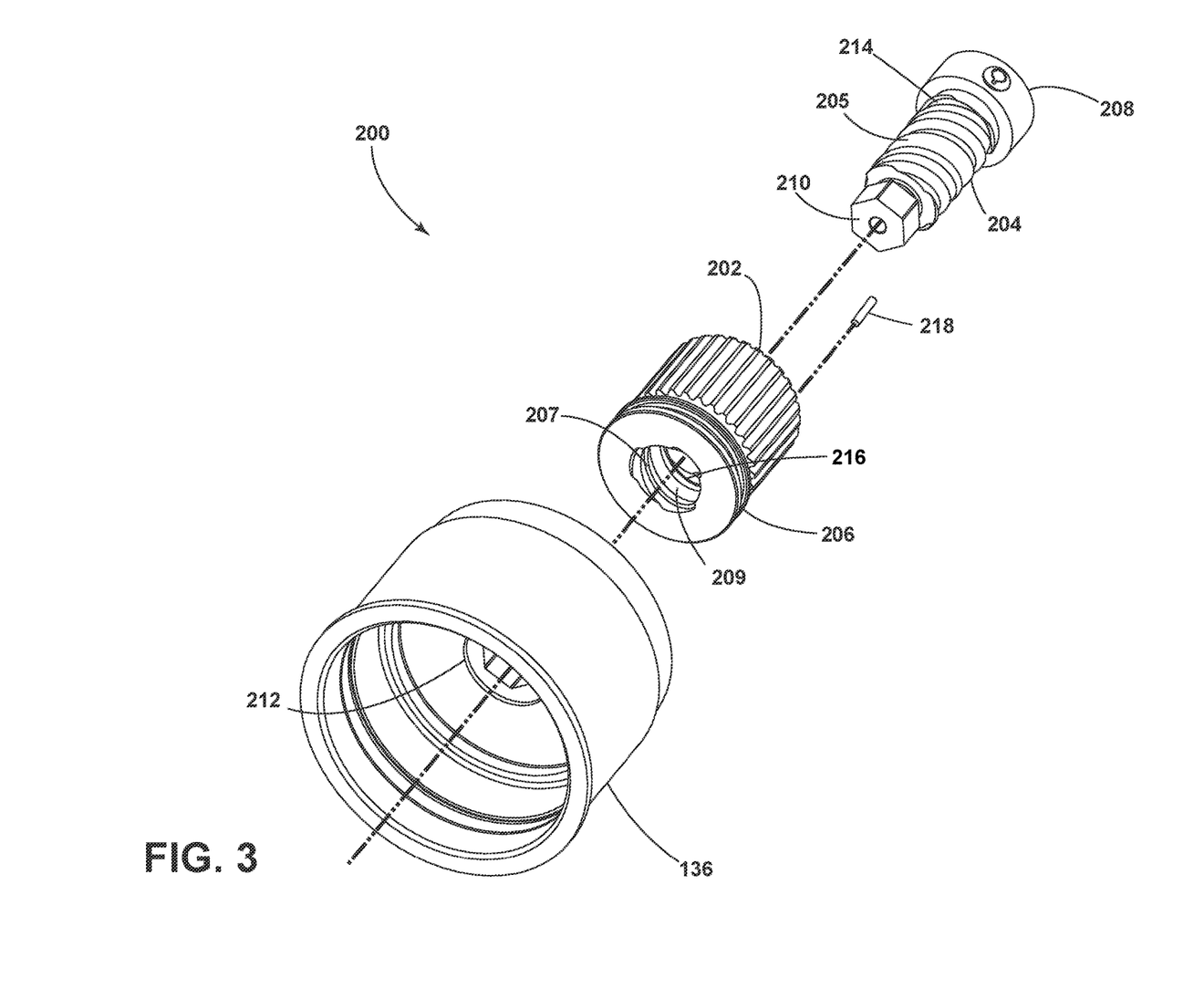
FIG. 3 is an exploded view of a decoupler adapted for use with the starter of FIG. 2 in accordance with various aspects described herein.

FIG. 3 illustrates an exploded perspective view of one exemplary embodiment of the backdrive decoupler 200 and drive shaft 136 configuration. The threaded portion 206 of the output shaft 202 can be an internal threaded portion 207 illustrated as including a three helical female thread within the output shaft 202. An upper portion or lip 216 of the output shaft 202 can be formed below a first end 208 of the threaded shaft 204.

The threaded shaft 204 includes the first end 208 and a second end 210, wherein the first end 208 is received within the threaded portion 206 of the output shaft 202. The first end 208 can further include at least one portion formed to be a stop 214 that abuts with the lip 216 of the output shaft 202. The second end 210 is received within the drive shaft 136 and secured with a washer or cap assembly 212 welded to the drive shaft 136.

The threaded shaft 204 comprises first driving surfaces 205 and the threaded portion 206 of the output shaft 202 comprises second driving surfaces 209 that interengage with the first driving surfaces to transmit a driving torque.

A retention mechanism comprising a shear pin 218 can extend axially through the output shaft 202 and the threaded shaft 204. The shear pin 218 selectively operably couples the output shaft 202 to the first end 208. When a driving torque is transmitted through the output shaft 202 and stop(s) 214 the shear pin 218 remains unloaded.

Figure 4:
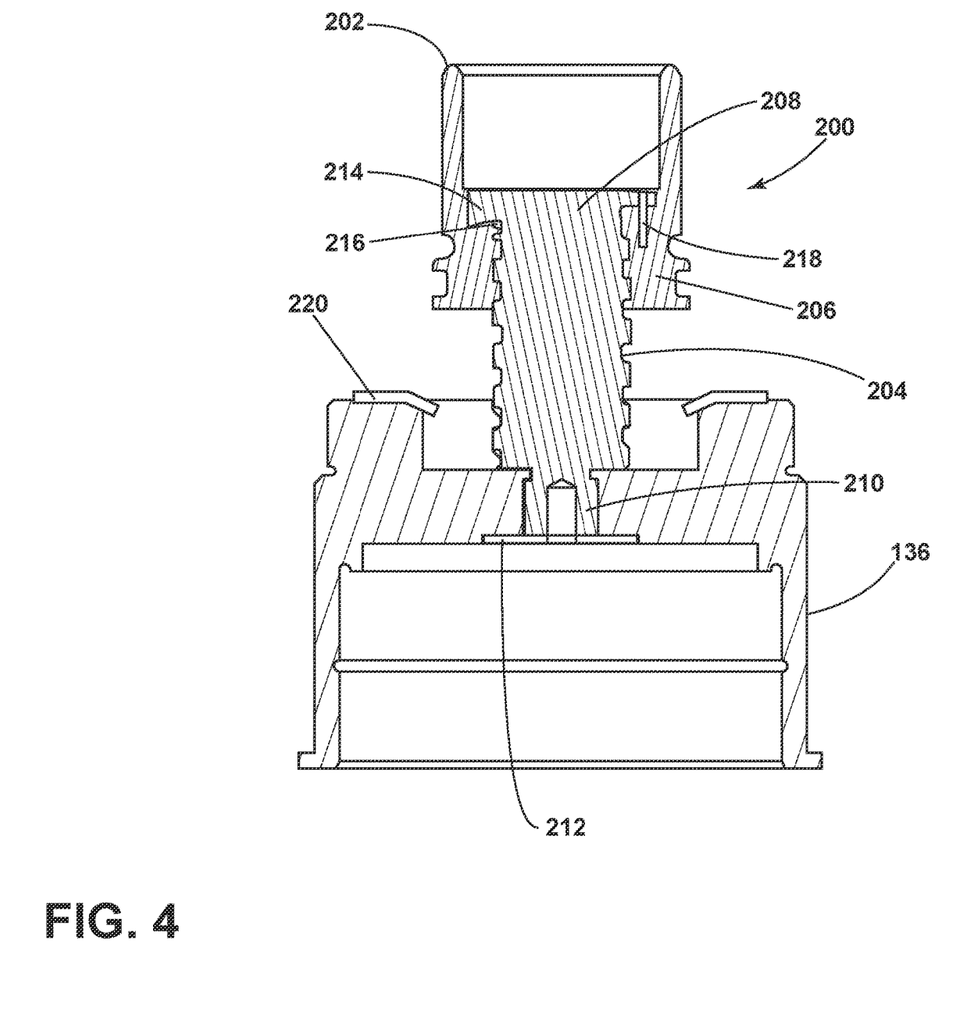
FIG. 4 is a sectional view of the decoupler of FIG. 3 in a first position relative to the rotating shaft, in accordance with various aspects described herein.

FIG. 4 illustrates a cross-sectional view of the backdrive decoupler 200 and drive shaft 136. Under normal drive operating conditions in which the clutch 132 is engaged and the air turbine starter 102 is driving the gas turbine engine 1, the shear pin 218 and the threaded shaft 204 are not loaded, while the stop(s) 214 are loaded. When the clutch 132 becomes disengaged and the gas turbine engine 1 transmits an overrunning torque below a certain level to the air turbine starter 102 the stop(s) 214 become unloaded while the shear pin 218 and threaded shaft 204 become partially loaded.

Figure 5:
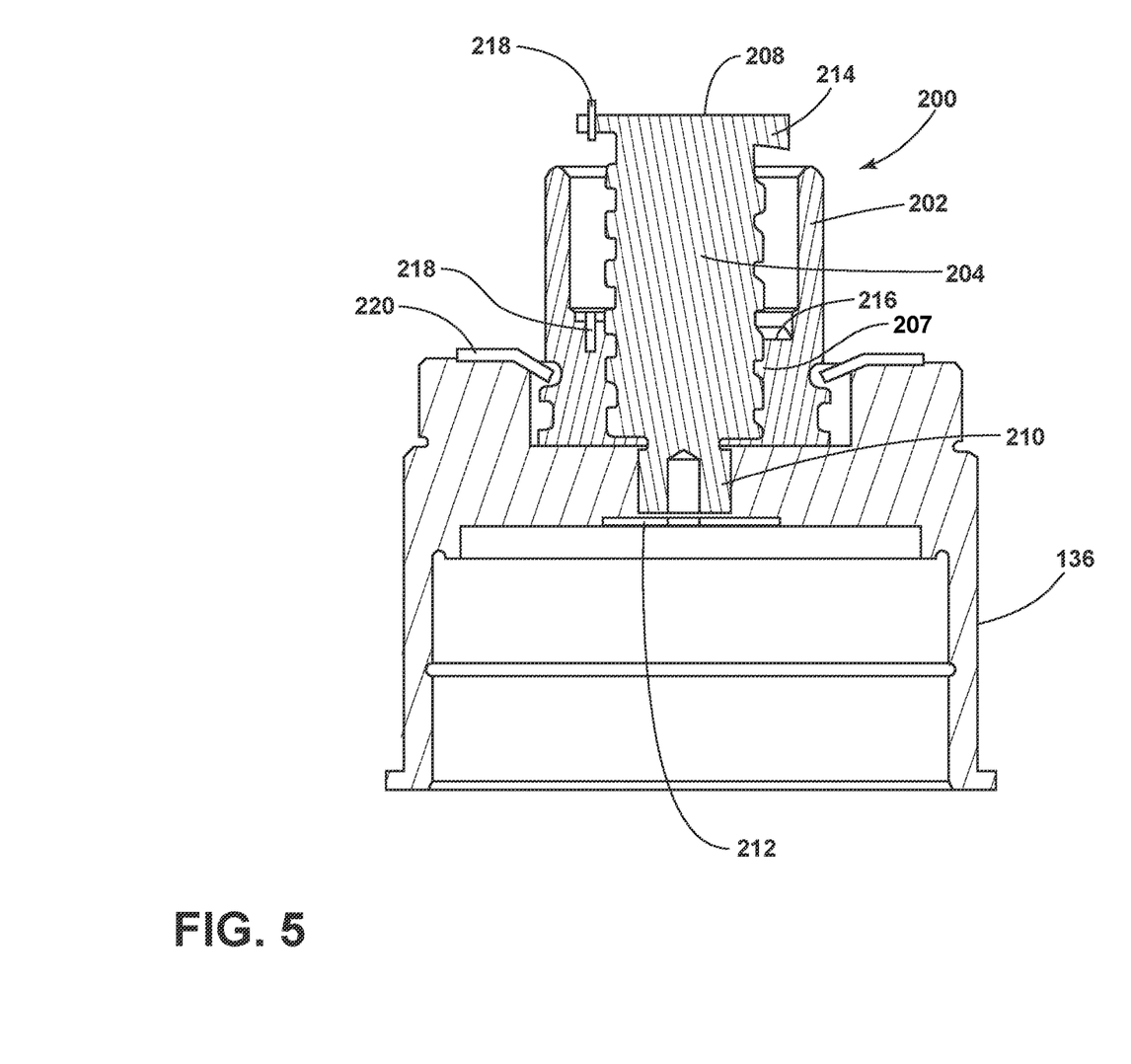
FIG. 5 is a sectional view of the decoupler of FIG. 3 in a second position contacting the rotating shaft, in accordance with various aspects described herein.

Turning to FIG. 5, in the event of a backdrive, which can occur when the clutch 132 fails, the clutch 132 will become engaged. Simultaneously the gas turbine engine 1 transmits an overrunning torque at or above a certain level to the air turbine starter 102 causing the shear pin 218 and threaded shaft 204 to become fully loaded. In a fully loaded state the shear pin 218 will shear to unload the threaded shaft 204 in order to decouple the output shaft 202 causing the output shaft 202 to retract and disengage from the gas turbine engine 1, moving away from the first end 208 of the threaded shaft 204. A locking mechanism comprising a spring lock 220 is configured to secure the output shaft 202 in a decoupled and separate position.

Decoupling the air turbine starter 102 from the gas turbine engine 1 allows the engine to continue functioning in a back drive event. The spring lock 220 is implemented to lock the output shaft 202 in place and prevent reengagement with the engine 1. In a traditional decoupler, the output shaft 202 remains in the air turbine starter 102, while removing the output shaft 202 allows it to spin during overrunning without transferring the resulting torque to the air turbine starter 102.

Figure 6A:
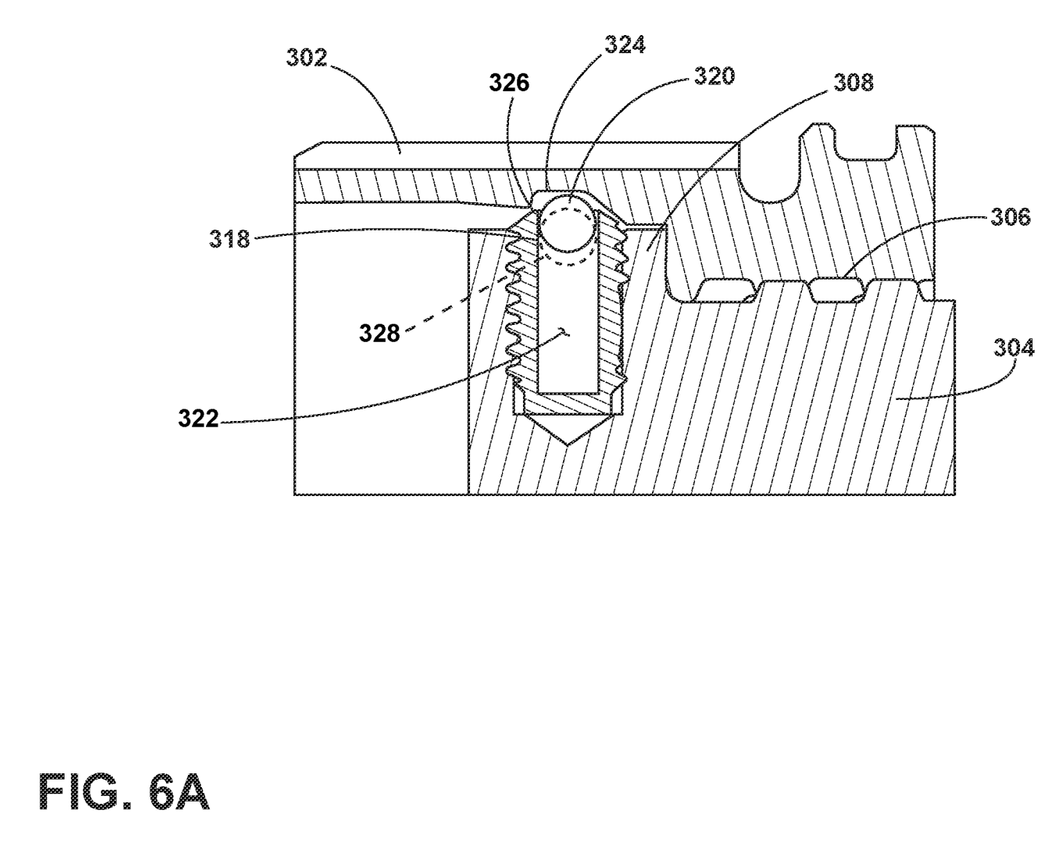
FIG. 6A and FIG. 6B are sectional views of an alternative retention mechanism for the decoupler of FIG. 3.
Figure 6B:
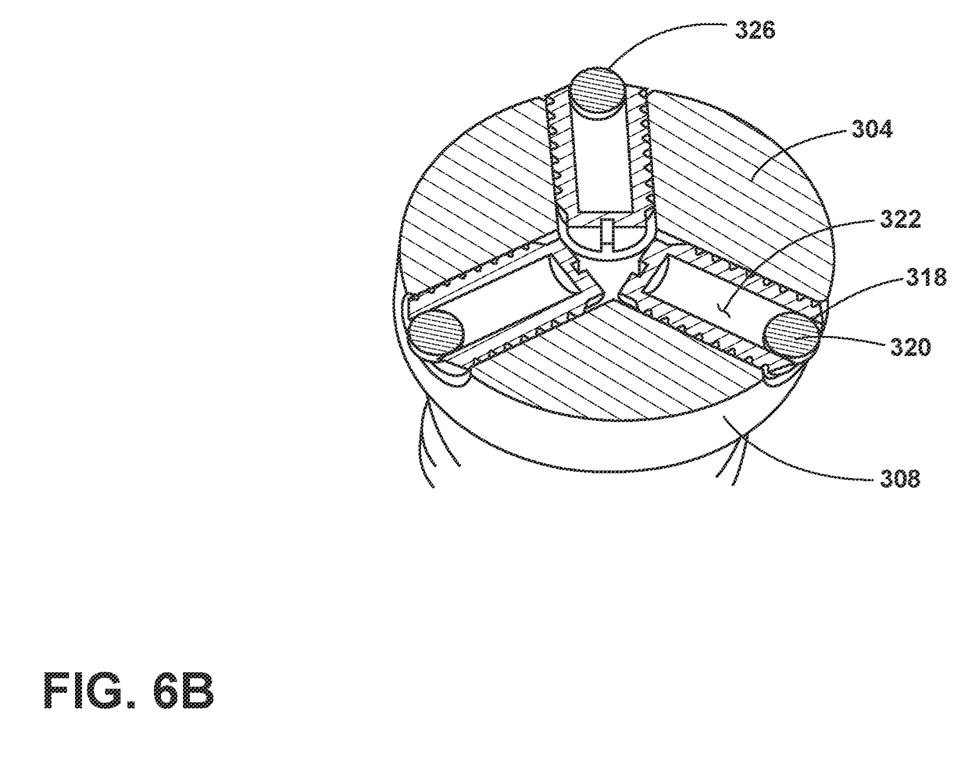

An alternative embodiment of a retention mechanism is illustrated in FIGS. 6A and 6B. This embodiment is similar to the first embodiment, therefore, like parts are identified with like numerals increasing by 100, with it being understood that the description of the like parts of the first embodiment applies to the additional embodiment, unless otherwise noted. This alternative embodiment can include at least one plunger 318 including a moveable element 320, for example but not limited to a ball detent, disposed within a channel 322. The plunger 318 can be positioned within a first end 308 of the thread shaft 304 replacing or in addition to the shear pin 218 as described previously. The moveable element engages with an interface portion formed as a ledge or pocket 324 within the output shaft 302 when in a first position 326.

When the overrunning torque reaches a certain level the moveable element 320 moves radially inward within the channel 322 to a second position 328. The threaded shaft 304 is therefore disengaged from the output shaft 302 enabling the output shaft 302 to move to a position similar to the one illustrated in FIG. 5 where the output shaft 302 is no longer coupled to the gas turbine engine 1.

While FIG. 6B illustrates three plungers 318, it should be understood that this is for exemplary purposes and more or less plungers can be positioned within the first end 308 of the output shaft 302.

Figure 7:
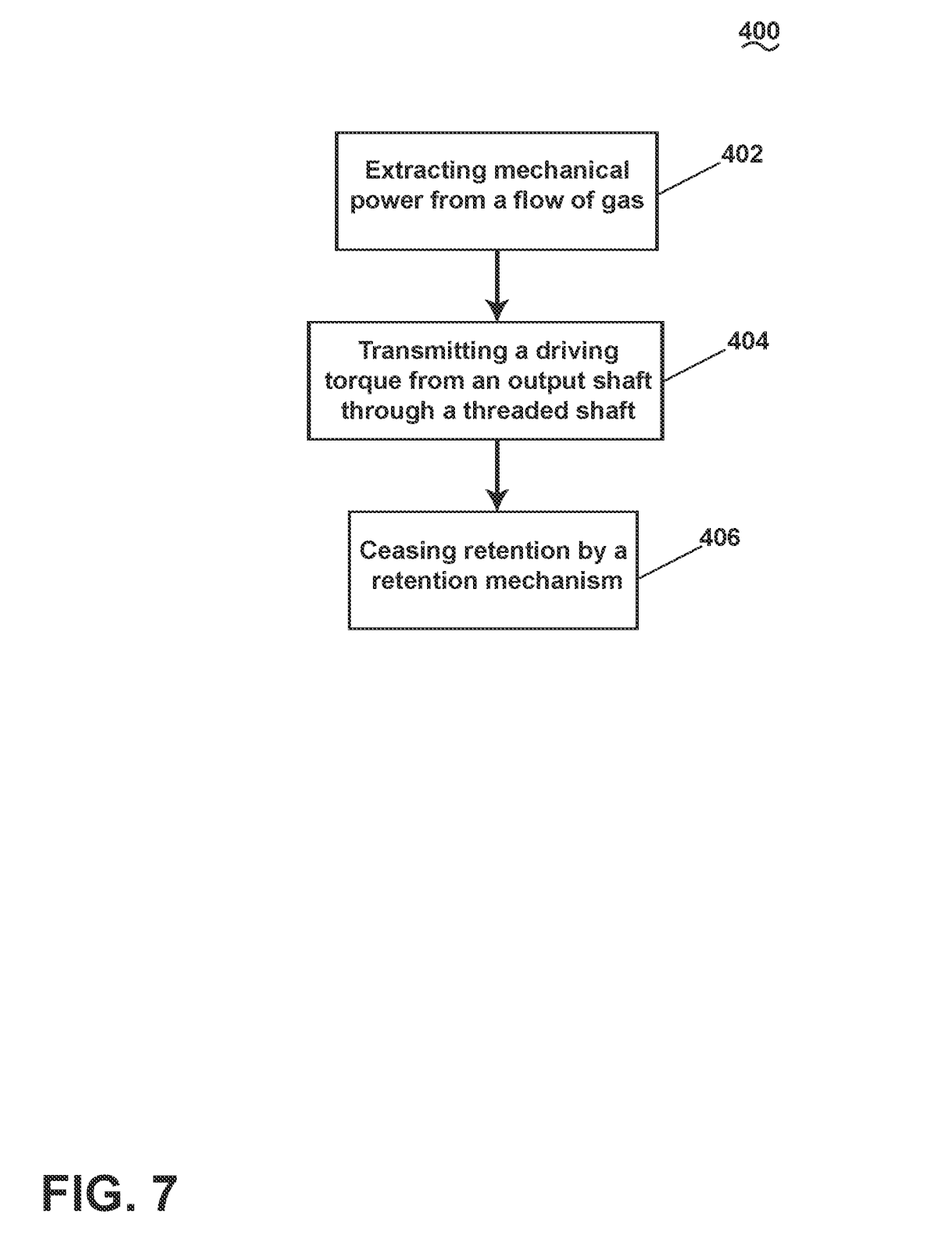
FIG. 7 is a flow chart of a method for operating an air turbine starter.

A method 400 for operating the air turbine starter 102 is outlined in a flow chart in FIG. 7. The method 400 begins at 402 with extracting mechanical power from a flow of gas utilizing the turbine 116 that in turn drives the gear train 118 and clutch 132, including the drive shaft 136. At 404 a driving torque is transferred from the drive shaft 136 to the threaded output shaft 202, which is operably coupled to the engine 1, through the threaded shaft 204 retained within the threaded output shaft 202 by the retention mechanism, for example the shear pin 218 or moveable element 320. The clutch 132 allows for overrun where overrunning torque is transmitted below a certain level and the output shaft 202, retention mechanism 218, 320, and threaded shaft 204 are loaded.

Overrunning torque is drag torque from the air turbine starter 102. During normal operation this drag torque comes from the bearings 134 and viscous shear from the lubrication in the air turbine starter 102. During a backdrive event, the overrunning torque comes from all the bearings 124, 126, 134 and is amplified by the accessory gear box 100. This mechanical advantage enables the shear pin 218 to shear.

In the case of back driving, at 406 the retention mechanism 218, 320 ceases retention when the overrunning torque reaches a certain level such that the threaded output shaft 202 spins, relative to the output shaft, axially away from the engine until it is fully disengaged from the engine 1. The output shaft 202 is then retained to prevent reengagement of the output shaft 202 to the gear train 118.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

The embodiments disclosed herein provide a decoupler for decoupling a torque load coming from the engine to prevent backdriving of the entire air turbine starter. Benefits associated with this decoupling include reducing the risk of spinning a damaged air turbine starter, which could cause additional damage to the air turbine starter if not decoupled. By decoupling, the retention mechanism need only be replaced or reset. This prevents more costly replacement parts in the event of additional damage.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air turbine starter for starting an engine, comprising:
   a housing defining an inlet, an outlet, and a flow path extending between the inlet and the outlet for communicating a flow of gas therethrough;
   a turbine journaled within the housing and disposed within the flow path for rotatably extracting mechanical power from the flow of gas;
   a gear train drivingly coupled with the turbine;
   a clutch having a drive shaft that is operably coupled with the gear train;
   an output member with a receiving portion defining a rotational axis and configured to be operably coupled to and rotate with the engine; and
   a backdrive decoupler, comprising:
      a decoupler shaft extending between a first end operably coupled to the output member and a second end operably coupled to the drive shaft, the decoupler shaft received within the receiving portion and axially moveable along the rotational axis with respect to the receiving portion of the output member; and
      a retention mechanism having a principal axis extending axially through a portion of the output member and a portion of the first end of the decoupler shaft to retain the decoupler shaft within the receiving portion;
   wherein when an overrunning torque reaches a certain level the retention mechanism uncouples the drive shaft and the first end of the decoupler shaft to define a decoupled and separated position where the output member is disengaged from the engine.

2. The air turbine starter of claim 1 wherein the retention mechanism is a pin wherein the pin shears when the overrunning torque reaches the certain level.

3. The air turbine starter of claim 1 wherein the output member further comprises first driving surfaces and the decoupler shaft comprises second driving surfaces that interengage with the first driving surfaces to transmit a driving torque.

4. The air turbine starter of claim 3 wherein the decoupler shaft further comprises a stop at the first end that abuts with a portion of the output member.

5. The air turbine starter of claim 4 wherein the driving torque is transmitted through the stop of the decoupler shaft and the output member.

6. The air turbine starter of claim 1, further comprising a locking mechanism configured to secure the output member in the decoupled and separated position.

7. The air turbine starter of claim 6 wherein the locking mechanism comprises a spring lock.

8. The air turbine starter of claim 1 wherein the retention mechanism comprises at least one moveable element that is moveable between a first position and a second position, where in the first position the moveable element engages with an interface portion of the output member and in the second position the moveable element is disengaged from the interface portion.

9. The air turbine starter of claim 8 wherein the moveable element is a ball detent that moves radially inward within a channel received in the decoupler shaft when the overrunning torque reaches the certain level.

10. The air turbine starter of claim 1 wherein the receiving portion of the output member is an internal threaded portion and the decoupler shaft is a threaded shaft complimentary to the internal threaded portion.

11. The air turbine starter of claim 10 wherein the internal threaded portion is a three helical female thread.

12. A decoupler assembly for decoupling an output member from a drive shaft of an engine during backdrive, the decoupler assembly comprising
   a shaft having a first end with a stop and a second end configured to be operably coupled to the drive shaft and where the shaft is receivable and axially moveable within a receiving portion of the output member, the shaft defining a rotational axis; and
   a retention mechanism having a principal axis extending axially through a portion of the output member and a portion of the shaft and coupling the output member to the first end of the shaft;
   wherein a driving torque from the drive shaft is transmitted through the shaft to the output member, and when an overrunning torque reaches a certain level, the retention mechanism uncouples the output member and the first end of the shaft and the output member moves in a direction away from the first end of the shaft.

13. The decoupler assembly of claim 12 wherein the retention mechanism is a pin and wherein the pin shears when the overrunning torque reaches the certain level.

14. The decoupler assembly of claim 12 wherein a driving torque is transmitted through the stop of the shaft and the output member.

15. The decoupler assembly of claim 12, further comprising a locking mechanism configured to secure the output member in a decoupled position.

16. The decoupler assembly of claim 12 wherein the retention mechanism comprises at least one moveable element that is moveable between a first position and a second position, where in the first position the moveable element engages with an interface portion of the output member and in the second position the moveable element is disengaged from the interface portion.

17. The decoupler assembly of claim 16 wherein the moveable element is a ball detent that moves radially inward within a channel received in the shaft when the overrunning torque reaches the certain level.

18. The decoupler assembly of claim 12 wherein the output member further comprises first driving surfaces and the shaft comprises second driving surfaces that interengage with the first driving surfaces to transmit driving torque.

19. The decoupler assembly of claim 12 wherein the receiving portion of the output member is an internal threaded portion and the shaft is a threaded shaft complimentary to the internal threaded portion.

20. A method for operating a starter motor, comprising:
- extracting mechanical power from a flow of gas utilizing a turbine and driving a gear train and clutch having an output member therewith;
- transmitting a driving torque from a drive shaft through a decoupler shaft retained within a receiving portion of the output member by a retention mechanism having a primary axis extending axially through a portion of the output member and a portion of the decoupler shaft to the output member, the output member operably coupled to an engine;
- during back driving, ceasing retention by the retention mechanism when overrunning torque reaches a certain level such that the output member decouples from the engine; and
- retaining the output member in place to prevent reengagement of the output member and the engine.

\* \* \* \* \*